US012175944B2

(12) United States Patent
Ban et al.

(10) Patent No.: US 12,175,944 B2
(45) Date of Patent: *Dec. 24, 2024

(54) DISPLAY APPARATUS AND METHOD OF DRIVING DISPLAY APPARATUS

(71) Applicant: SAMSUNG DISPLAY CO., LTD., Yongin-si (KR)

(72) Inventors: Seokgyu Ban, Suwon-si (KR); Wook Lee, Hwaseong-si (KR); Jaehoon Shin, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,078

(22) Filed: Dec. 22, 2022

(65) Prior Publication Data

US 2023/0125279 A1 Apr. 27, 2023

Related U.S. Application Data

(63) Continuation of application No. 17/643,850, filed on Dec. 13, 2021, now Pat. No. 11,551,622.

(30) Foreign Application Priority Data

Dec. 21, 2020 (KR) ........................ 10-2020-0180136

(51) Int. Cl.
*G09G 3/3291* (2016.01)

(52) U.S. Cl.
CPC ..... *G09G 3/3291* (2013.01); *G09G 2310/027* (2013.01); *G09G 2320/0285* (2013.01)

(58) Field of Classification Search
CPC ....... G09G 2320/048; G09G 2320/043; G09G 2320/045; G09G 2320/0285; G09G 2320/0233; G09G 2320/0295; G09G 2320/041; G09G 2320/029; G09G 2320/046; G09G 2320/0271; G09G 2320/0693; G09G 2320/0673; G09G 3/3233; G09G 2360/16
See application file for complete search history.

(56) References Cited

U.S. PATENT DOCUMENTS

2008/0231557 A1* 9/2008 Naugler ............... G09G 3/3225 345/76
2011/0037786 A1 2/2011 Hasegawa et al.
(Continued)

OTHER PUBLICATIONS

Office Action dated Sep. 11, 2024 in corresponding Korean Patent Application No. 10-2020-0180136 (10 pages), in Korean.

*Primary Examiner* — Dong Hui Liang
(74) *Attorney, Agent, or Firm* — F. CHAU & ASSOCIATES, LLC

(57) ABSTRACT

A display apparatus includes a display panel, a compensator, a controller, and a data driver. The compensator determines a degradation grayscale of a compensation region of the display panel. The degradation grayscale may be determined based on a driving time of at least one pixel in the compensation region and degradation data corresponding to the at least one pixel. The controller generates compensated image data for input image data based on the degradation grayscale. The data driver provides a data voltage to the at least one pixel based on the compensated image data.

19 Claims, 8 Drawing Sheets

(56) References Cited

U.S. PATENT DOCUMENTS

| | | | | |
|---|---|---|---|---|
| 2013/0147693 | A1* | 6/2013 | Bae | G09G 3/3225<br>345/82 |
| 2014/0118426 | A1* | 5/2014 | Chun | G09G 3/3208<br>345/691 |
| 2014/0176403 | A1* | 6/2014 | Inoue | G09G 3/2092<br>345/77 |
| 2016/0210897 | A1* | 7/2016 | Jun | G09G 3/3291 |
| 2017/0213493 | A1* | 7/2017 | Han | G09G 3/3208 |
| 2020/0265779 | A1* | 8/2020 | In | G09G 3/3225 |
| 2020/0372861 | A1* | 11/2020 | Ok | G09G 3/3233 |
| 2022/0199042 | A1 | 6/2022 | Ban et al. | |

* cited by examiner

DISPLAY APPARATUS AND METHOD OF DRIVING DISPLAY APPARATUS

PRIORITY STATEMENT

This continuation application claims priority under 35 U.S.C. § 120 to U.S. patent application Ser. No. 17/643,850, filed on Dec. 13, 2021, and claims priority under 35 U. S. C. § 119 to Korean Patent Application No. 10-2020-0180136, filed on Dec. 21, 2020 in the Korean Intellectual Property Office KIPO, the contents of which are herein incorporated by reference in their entirety.

BACKGROUND

1. Field

One or more embodiments described herein relate to a display apparatus and a method of driving a display apparatus.

2. Description of the Related Art

The pixel transistors in a display apparatus may have different characteristics, even when made during a common process. This is because of process variations and other factors. The different characteristics may cause the pixels to emit light with varied luminances based on the same (or substantially the same) display data. In addition, performance of the pixels may degrade over time, along with their driving characteristics. This is true of an organic light emitting diode (OLED) display apparatus, as well as other types of display apparatuses. Various attempts have been made to compensate for this luminance non-uniformity and pixel degradation, but those attempts have proven to be inadequate.

SUMMARY

Embodiments of the present inventive concept provide a display apparatus capable of improving degradation characteristics of pixels and/or reducing manufacturing costs.

Embodiments of the present inventive concept provide a method of driving a display apparatus, which method is capable of improving degradation characteristics and/or reducing manufacturing costs.

In accordance with one or more embodiments, a display apparatus includes a display panel including a plurality of pixels; a compensator configured to determine a degradation grayscale of a compensation region of the display panel, the degradation grayscale determined based on a driving time of at least one pixel of the plurality of pixels in the compensation region and degradation data corresponding to the at least one pixel; a controller configured to generate compensated image data for input image data based on the degradation grayscale; and a data driver configured to provide a data voltage to the at least one pixel based on the compensated image data.

In accordance with one or more embodiments, a method of driving a display apparatus includes determining a degradation grayscale of a compensation region on a display panel, the degradation grayscale determined based on a driving time of at least one pixel in the compensation region on the display panel and degradation data of the at least one pixel; calculating a compensation value of a characteristic value deviation of the compensation region based on the degradation grayscale; generating compensated image data by compensating input image data based on the compensation value; and providing a data voltage to the at least one pixel based on the compensated image data.

BRIEF DESCRIPTION OF THE DRAWINGS

The above and other features of the present inventive concept will become more apparent by describing in detailed embodiments thereof with reference to the accompanying drawings.

DETAILED DESCRIPTION OF THE INVENTIVE CONCEPT

Hereinafter, the present inventive concept will be explained in detail with reference to the accompanying drawings.

Figure 1:
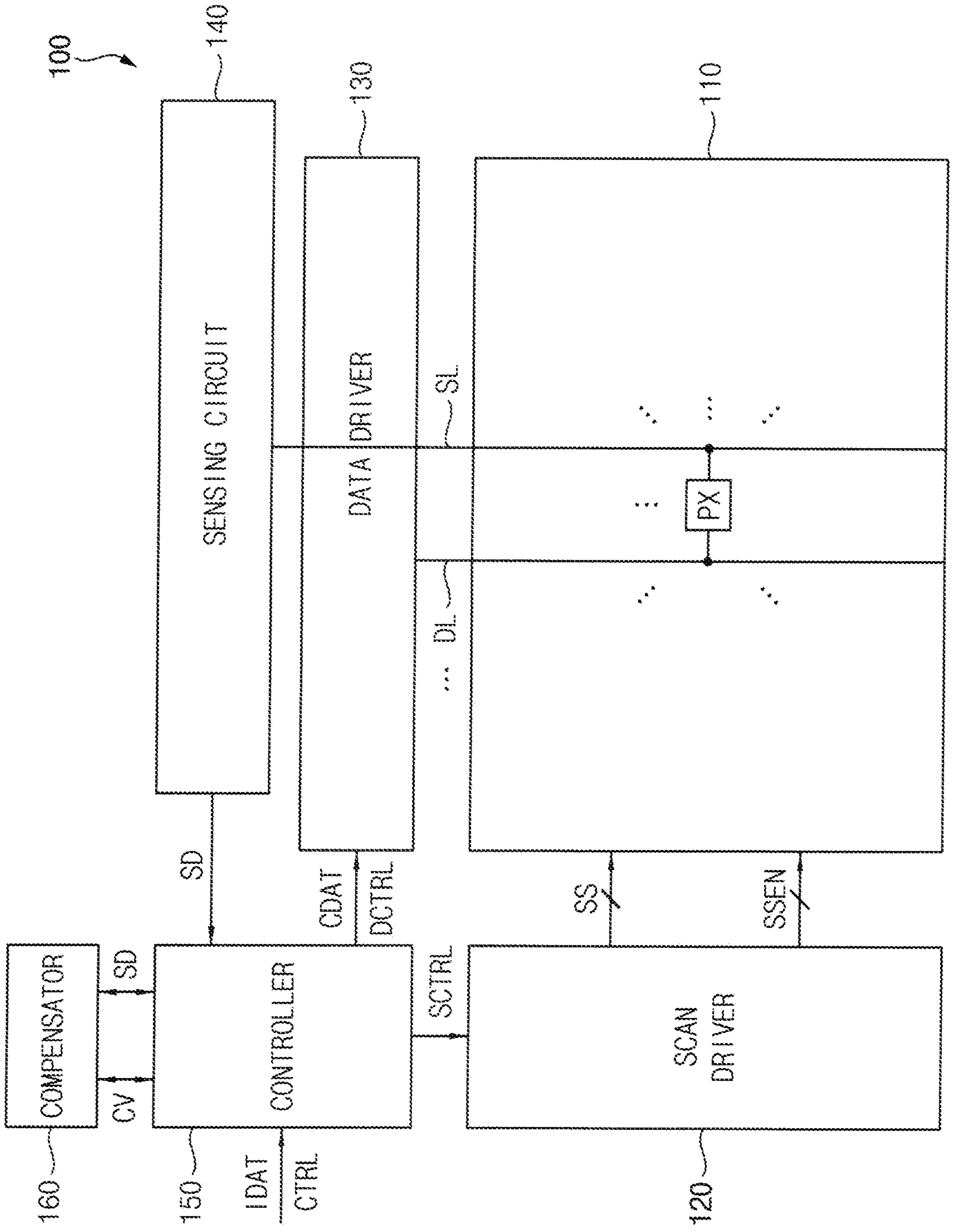
FIG. 1 illustrates an embodiment of a display apparatus.
Figure 2:
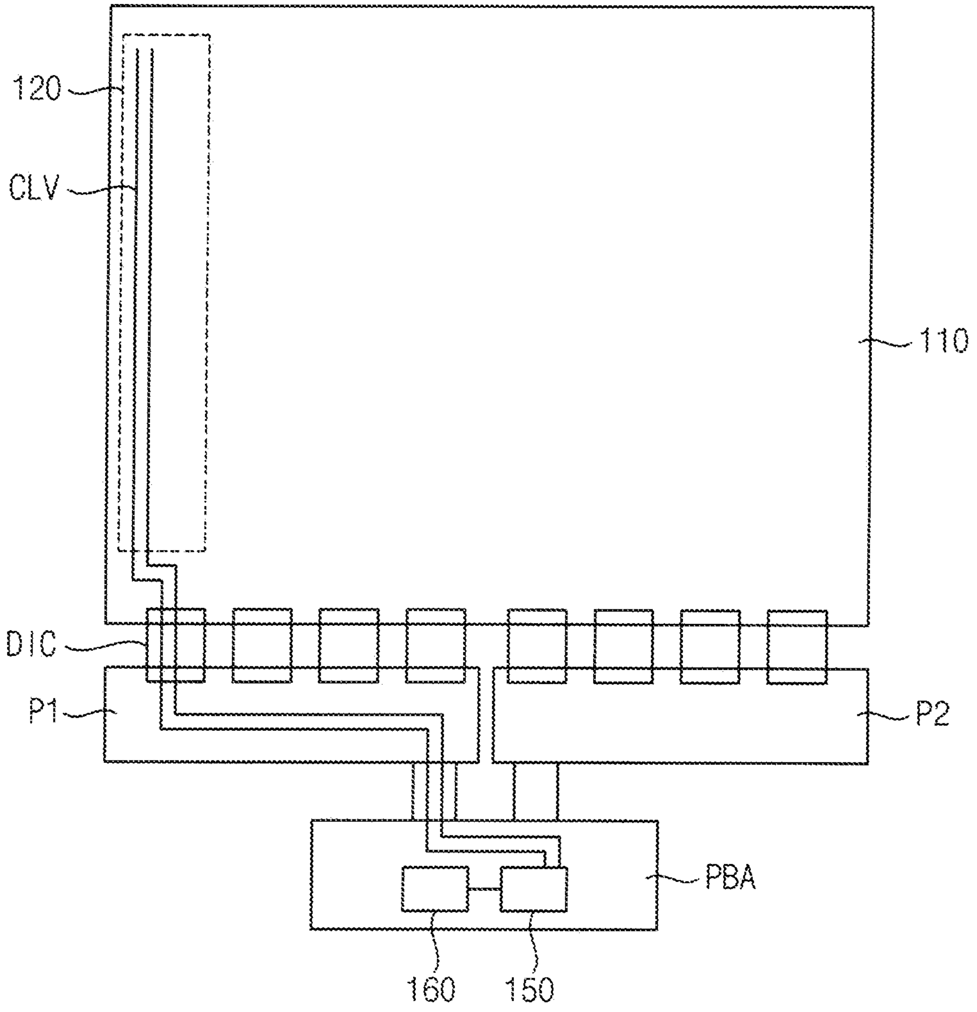
FIG. 2 illustrates a plan view of the display apparatus according to an embodiment.
Figure 3:
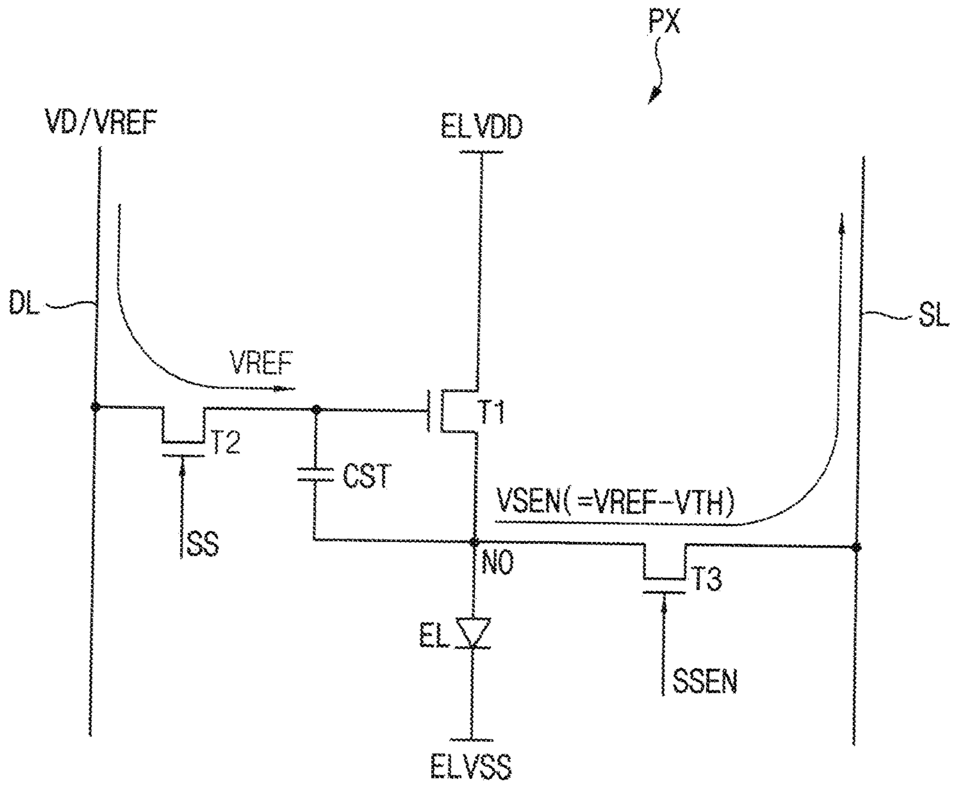
FIG. 3 illustrates an embodiment of a pixel.
Figure 4:
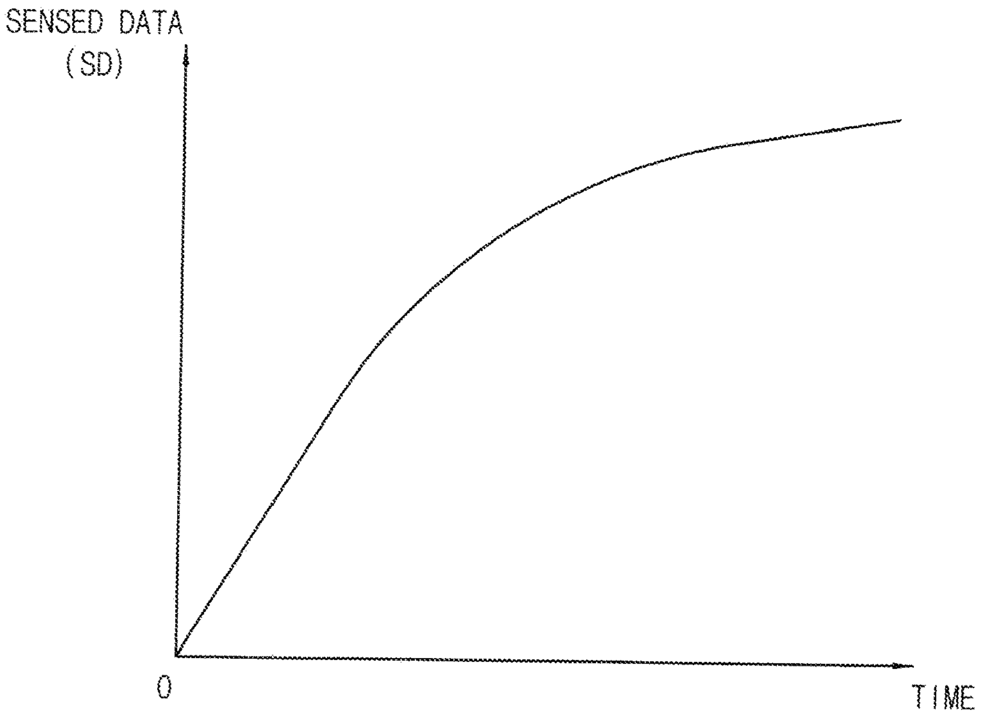
FIG. 4 illustrates an example of how sensed data may change with pixel driving time.

FIG. 1 is a block diagram illustrating a display apparatus 100 according to an embodiment of the present inventive concept. FIG. 2 is a plan view illustrating the display apparatus 100 of FIG. 1. FIG. 3 is a circuit diagram illustrating a pixel PX included in the display apparatus 100 according to an embodiment of the present inventive concept. FIG. 4 is a graph illustrating a change of sensed data SD according to a driving time DT of the pixel PX.

Referring to FIGS. 1 to 4, the display apparatus 100 may include a display panel 110, a scan driver 120, a data driver 130, a sensing circuit 140, a controller 150 and a compensator 160. In FIG. 1, the controller 150 and compensator 160 are shown separately. In one embodiment, the controller 150 may perform the operations of the compensator 160, e.g., the controller 150 and compensator 160 may be integrated.

The display panel 110 may include a plurality of data lines DL, a plurality of sensing lines SL, and a plurality of pixels PX coupled to the data lines DL and sensing lines SL. In embodiments, the number of sensing lines SL may be substantially the same as the number of data lines DL. In one embodiment, the number of sensing lines SL may be different from the number of data lines DL. For example, the display panel 110 may include one sensing line SL per three data lines DL. In some embodiments, each pixel PX may include an organic light emitting diode (OLED) and the display panel 110 may be an OLED panel.

As illustrated in FIG. 3, for example, each pixel PX may include a driving transistor T1, a switching transistor T2, and a storage capacitor CST. The switching transistor T2 transfers a data voltage DV (or a reference voltage VREF), received from the data line DL, in response to a scan signal SS. The storage capacitor CST stores the data voltage DV transferred from the switching transistor T2. The driving transistor T1 generates a driving current based on the data voltage DV stored in the storage capacitor CST.

In addition, each pixel PX may include an organic light emitting diode EL and a sensing transistor T3. The organic light emitting diode EL emits light in response to driving current flowing from a line of a first power supply voltage ELVDD to a line of a second power supply voltage ELVSS. The sensing transistor T3 connects a node NO (between the driving transistor T1 and the organic light emitting diode EL) to the sensing line SL in response to a sensing signal SSEN. In embodiments, as illustrated in FIG. 3, the driving transistor T1, the switching transistor T2 and the sensing transistor T3 may be NMOS transistors, but may be PMOS transistors or a combination of PMOS and NMOS transistors in other embodiments.

In addition, each pixel PX may have a different configuration and/or different elements than the example of FIG. 3. The display panel 110 may be, for example, an inorganic light emitting diode display panel, a quantum dot light emitting diode display panel, a liquid crystal display (or referred to as LCD) panel, or any other type of display panel.

The scan driver 120 may provide scan signals SS and/or sensing signals SSEN to the pixels PX based on a scan control signal SCTRL from the controller 150. In embodiments, the scan control signal SCTRL may include a scan start signal and a scan clock signal, but may include one or more other signals in another embodiment. In embodiments, the scan driver 120 may be integrated or formed in a peripheral portion of the display panel 110. In one embodiment, the scan driver 120 may be implemented with one or more integrated circuits.

The data driver 130 may provide the data voltages DV to the pixels PX through the data lines DL based on a data control signal DCTRL and compensated image data CDAT from the controller 150. In embodiments, the data control signal DCTRL may include an output data enable signal, a horizontal start signal and a load signal, but may include a different combination of signals in another embodiment. In embodiments, the data driver 130 and the sensing circuit 140 may be implemented with at least one integrated circuit. A single integrated circuit which includes the data driver 130 and the sensing circuit 140 may be referred to as a readout-source driver integrated circuit (RSIC). In embodiments, the data driver 130 and the controller 150 may be implemented with at least one integrated circuit. A single integrated circuit which includes the data driver 130 and the controller 150 may be referred to as a timing controller embedded data driver (TED). In embodiments, the data driver 130, the sensing circuit 140, and the controller 150 may be implemented with separate integrated circuits.

Referring to FIGS. 1 to 2, the controller 150 and the compensator 160 may be disposed in a printed circuit board assembly PBA. The compensator 160 may be disposed in the controller 150 and may be integrally formed with the controller 150. The printed circuit board assembly PBA may be connected to a first printed circuit P1 and a second printed circuit P2.

In an embodiment, the data driver 130 may include a plurality of data driving chips DIC connected between the first printed circuit P1 and the display panel 110. In one embodiment, the plurality of data driving chips DIC may also be connected between the second printed circuit P2 and the display panel 110. In one embodiment, data driver 130 may include the sensing circuit 140, e.g., sensing circuit 140 may be disposed in and be integrally formed with the data driver 130.

In an embodiment, the scan driver 120 may be disposed in the display panel 110. The controller 150 may output a gate clock signal CLV to the scan driver 120 disposed in the display panel 110. In an embodiment, gate clock signal lines for applying the gate clock signal CLV may be disposed on the display panel 110.

The sensing circuit 140 may be coupled to the sensing lines SL of the display panel 110 and may sense driving characteristics (e.g., threshold voltages VTH, mobilities, and/or other characteristics) of the driving transistors T1 of the pixels PX through the sensing lines SL.

As illustrated in FIGS. 1 and 3, for example, in a sensing period the data driver 130 may provide the reference voltage VREF to the pixels PX through the data lines DL. The nodes NO, between the driving transistors T1 and the organic light emitting diodes EL in the pixels PX, may have voltages VREF-VTH, where the threshold voltages VTH of the driving transistors T1 are subtracted from the reference voltage VREF. The sensing circuit 140 may receive a plurality of sensed voltages VSEN, or the voltages VREF-VTH where the threshold voltages VTH are subtracted from the reference voltage VREF, from the pixels PX through the sensing lines SL.

In the sensing period, the second power supply voltage ELVSS may be adjusted to have a voltage level substantially the same as a voltage level of the first power supply voltage ELVDD. Thus, the organic light emitting diodes EL may not emit light. In addition, the sensing circuit 140 may generate sensed data SD corresponding to differences between the reference voltage VREF and the sensed voltages VSEN, or corresponding to the threshold voltages VTH of the driving transistors T1 of the pixels PX. In embodiments, the sensing circuit 140 may include an analog-to-digital converter (ADC) for converting the threshold voltages VTH into the sensed data SD, but is not limited thereto.

The controller 150 may receive the sensed data SD from the sensing circuit 140 and transmit the sensed data SD to the compensator 160. In embodiments, the sensing circuit 140 may generate the sensed data SD when the display apparatus 100 is manufactured (or before the pixels PX become substantially degraded), when the display apparatus 100 is powered on or off and/or periodically during an operation of the display apparatus 100.

As illustrated in FIGS. 3 and 4, the sensed data SD may increase in proportion to the driving time DT of the pixel PX. For example, the sensed data SD may increase according to degradation of the driving transistor T1 in the pixel PX. Since the driving transistor T1 is repeatedly turned on and off when the display panel 110 is driven, degradation of the driving transistor T1 may increase as driving time DT increases. Accordingly, the sensed data SD may increase in proportion to the driving time DT of the driving transistor T1 in the pixel PX. In one embodiment, the sensed data SD may be an index indicating a degree of degradation of the driving transistor T1. The sensing circuit 140 may transmit the sensed data SD to the controller 150, and the controller 150 may transmit the sensed data SD to the compensator 160.

The controller 150 (e.g., a timing controller (TCON)) may receive input image data IDAT and a control signal CTRL from an external host processor (e.g., a graphic processing unit (GPU), an application processor (AP), or a graphics card). In embodiments, the input image data IDAT may be RGB image data including red image data, green image data and blue image data. In embodiments, the control signal CTRL may include a vertical synchronization signal, a horizontal synchronization signal, an input data enable signal, a master clock signal, etc., but may include a different combination of signals in another embodiment.

The controller 150 may control operation of the scan driver 120 by providing the scan control signal SCTRL to the scan driver 120, and may control operation of the data driver 130 by providing the compensated image data CDAT and the data control signal DCTRL to the data driver 130. The controller 150 may receive the sensed data SD from the sensing circuit 140 and may transmit the sensed data SD to the compensator 160.

The compensator 160 may receive the sensed data SD representing one or more driving characteristics (e.g., threshold voltages VTH, mobility, and/or other characteristics) of the driving transistors T1 of the pixels PX. In embodiments, when the display apparatus 100 is manufactured or before the pixels PX become substantially degraded, the sensed data SD may be generated and total threshold voltage data may be input. The sensed data SD may include a plurality of threshold voltage data representing the threshold voltages VTH of the driving transistors T1 of the pixels PX. The total threshold voltage data may be calculated, for example, by summing the threshold voltage data and may be input as initial total threshold voltage data before the pixels PX become substantially degraded. This calculation may be performed in the controller 150.

In addition, after the driving time DT of the display apparatus 100 is increased or after the pixels PX become substantially degraded, the controller 150 may receive the sensed data SD periodically or non-periodically. The controller 150 may transmit the sensed data SD received from the sensing circuit 140 to the compensator 160. For example, the compensator 160 may receive the sensed data SD from the controller 150 when the display apparatus 100 is turned on or off and/or, for example, over a predetermined number of frame periods.

As the driving time DT of the display apparatus 100 increases, the pixels PX may be degraded. The compensator 160 may generate degradation data DD of the pixels PX based on the sensed data SD, and may calculate a compensation value CV for a characteristic value deviation of a compensation region based on the degradation data DD. For example, the compensator 160 may determine a degradation grayscale of the compensation region based on the driving time DT of at least one pixel PX in the compensation region and the degradation data DD of at least one pixel PX in the compensation region. The compensator 160 may calculate a compensation value CV of a characteristic value deviation of the compensation region based on the degradation grayscale.

The compensator 160 may output the compensation value CV to the controller 150, and the controller 150 may generate compensated image data CDAT by compensating input image data IDAT based on the compensation value CV. The controller 150 may output the compensated image data CDAT to the data driver 130, and the data driver 130 may provide a data voltage DV to a corresponding pixel PX based on the compensated image data CDAT. Since the threshold voltages VTH of the driving transistors T1 of the degraded pixels PX are reflected in the data voltages DV generated based on the compensated image data CDAT, the pixels PX may emit light with uniform luminance.

Figure 5:
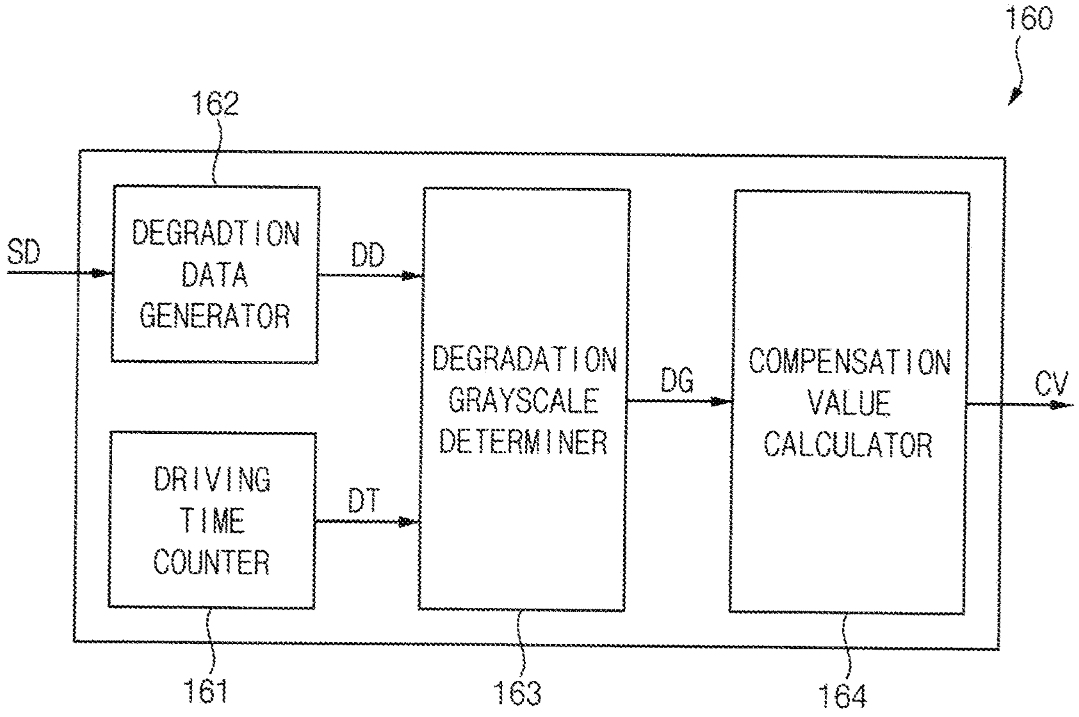
FIG. 5 illustrates an embodiment of a compensator.
Figure 6:
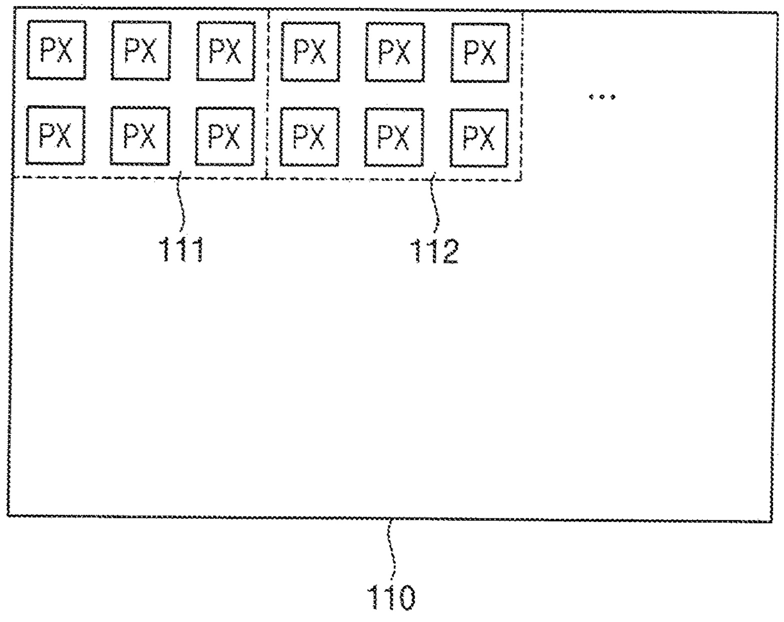
FIG. 6 illustrates a compensation region according to an embodiment.
Figure 7:
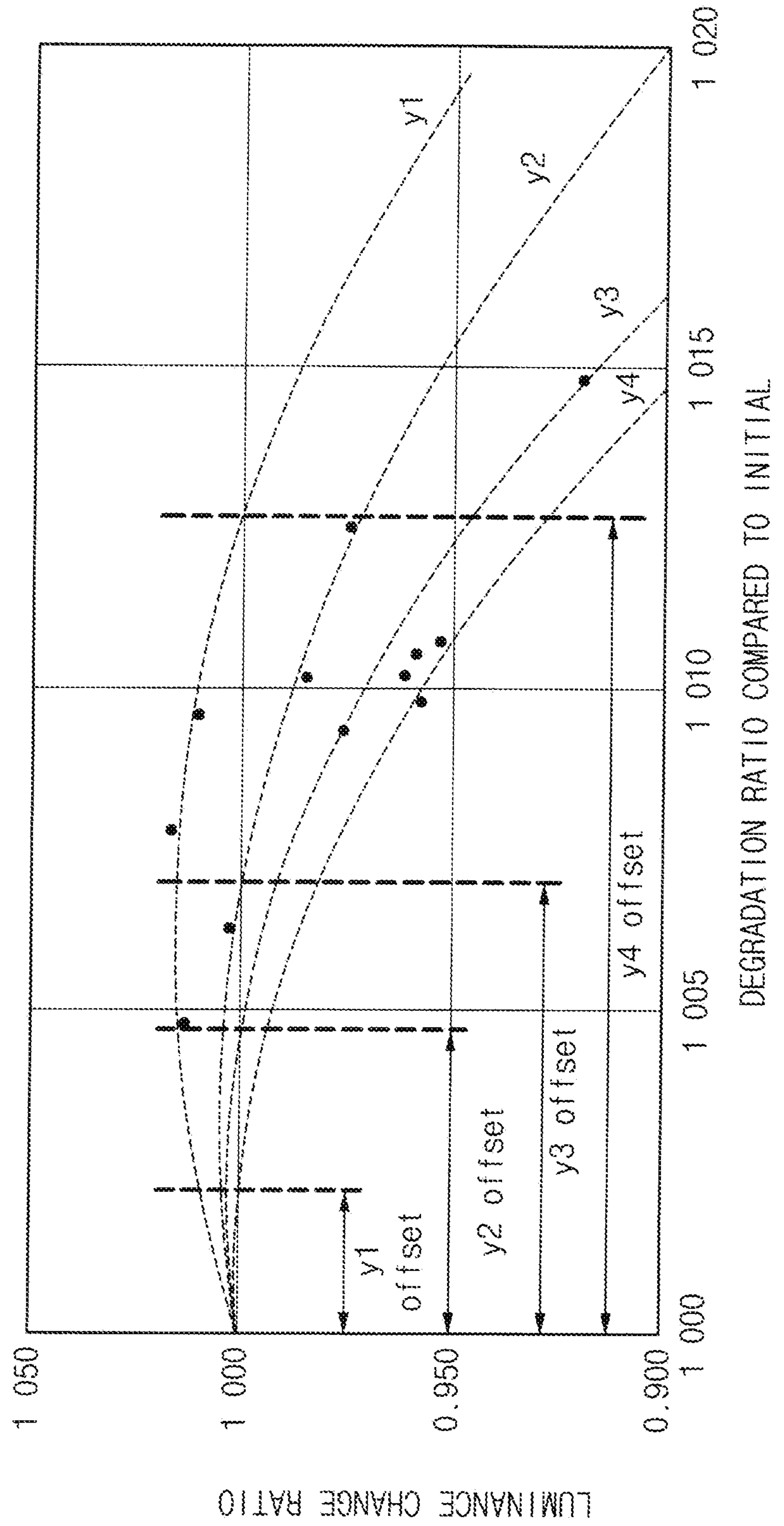
FIG. 7 illustrates an example of the correlation that may exist between a degradation ratio and a luminance change ratio for each of a plurality of degradation grayscales.

FIG. 5 is a block diagram illustrating the compensator 160 in the display apparatus 100 according to an embodiment of the present inventive concept. FIG. 6 is a diagram illustrating the compensation region of the display panel 110 according to an embodiment of the present inventive concept. FIG. 7 is a graph illustrating a correlation between a degradation ratio and a luminance change ratio for each degradation grayscale.

Referring to FIGS. 1 and 5 to 7, the display apparatus 100 may generate the degradation data DD of a pixel PX based on the sensed data SD, calculate the compensation value CV of the characteristic value deviation of the compensation region, and generate the compensated image data CDAT by compensating the input image data IDAT based on the compensation value CV. For example, the compensator 160 may determine the degradation grayscale DG of the compensation region based on the driving time DT of at least one pixel PX in the compensation region and the degradation data DD of at least one pixel PX in the compensation region. The compensator 160 may calculate a compensation value CV of a characteristic value deviation of the compensation region based on the degradation grayscale DG. The compensator 160 may output the compensation value CV to the controller 150, which may then generate compensated image data CDAT by compensating input image data DAT based on the compensation value CV.

In an embodiment, the compensator 160 may include a driving time counter 161, a degradation data generator 162, a degradation grayscale determiner 163, and a compensation value calculator 164. For example, the driving time counter 161 may count the driving time DT of a corresponding pixel PX. The degradation data generator 162 may generate the degradation data DD of the pixel PX based on the sensed data SD. The degradation grayscale determiner 163 may determine the degradation grayscale DG of the compensation region based on the driving time DT and the degradation data DD. The compensation value calculator 164 may calculate the compensation value CV of the characteristic value deviation of the compensation region.

In one embodiment, the driving time counter 161 may count a driving time of the display panel 110 from starting to ending of the driving of the display panel, and may determine the driving time of the display panel 110 as the driving time DT of the pixel. The driving time counter 161 may count a time of while an image is actually output in the compensation region. The driving time counter 161 may count a time from start of the driving of the display panel 110 to the end of the driving of the display panel 110 (e.g., the driving time of the display panel 110). For example, the driving time counter 161 may sense the starting of driving of the display panel 110 and the end of driving of the display panel 110 by detecting whether power for driving the display panel 110 is applied. The driving time counter 161 may determine the driving time of the display panel 110 as the driving time DT of the pixel PX in the compensation region. In one embodiment, the driving time counter 161 may receive sensed data SD for at least one pixel PX in the compensation region and may determine the driving time DT of the pixel PX based on the received sensed data SD.

According to an embodiment of the present inventive concept, the display apparatus 100 may compensate the characteristic value deviation for each compensation region on the display panel 110. As illustrated in FIG. 6, a plurality of compensation regions 111 and 112 may be disposed on the display panel 110. One compensation region 111 may include a plurality of pixels PX, and another compensation region 112 adjacent to the compensation region 111 may include the plurality of the pixels PX.

According to the present inventive concept, the display apparatus 100 may count the driving time DT of each of the compensation regions 111 and 112 and may generate degradation data DD of each of the compensation regions 111 and 112, so that the display apparatus 100 may compensate the characteristic value deviation for each compensation region. Although the compensation region includes a plurality of pixels PX in FIG. 6 as an example, the present inventive concept may not be limited to this type of compensation region. For example, the compensation region may include one pixel of the plurality of the pixels PX. In one embodiment, the compensation region may include all or a predetermined portion of pixels of the display panel 110. In embodiments, the compensation region on the display panel 110 may be set by a user.

The degradation data generator 162 may generate the degradation data DD of the pixel PX based on the sensed data SD. The sensed data SD may be an index indicating a degree of the degradation of the driving transistor T1. The degradation data generator 162 may receive the sensed data SD, and in one embodiment may calculate the degree of degradation of the driving transistor T1 based on a change amount of the sensed data SD from initial sensed data SD. For example, the degradation data generator 162 may change the amount of the sensed data SD by comparing the initial sensed data SD with current sensed data SD. The degradation data generator 162 may generate the degradation data DD by converting the change amount of the sensed data SD to a numerical value. The degradation data generator 162 may output the degradation data DD to the degradation grayscale determiner 163.

The degradation grayscale determiner 163 may determine the degradation grayscale DG of the compensation region based on the driving time DT and the degradation data DD. The degradation grayscale determiner 163 may receive the driving time DT from the driving time counter 161 and may receive the degradation data DD from the degradation data generator 162. The degradation grayscale determiner 163 may calculate a degradation time change ratio by dividing the degradation data DD by the driving time DT of the pixel PX.

In one embodiment, the degradation grayscale determiner 163 may calculate a degradation time change ratio constant by dividing the degradation time change ratio by a reference degradation time change ratio. The reference degradation time change ratio may be set, for example, by a user or based on the intended application. In one embodiment, the degradation time change ratio constant may have a linear correlation with the degradation grayscale DG. For example, when the degradation grayscale determiner 163 calculates the degradation time change ratio constant, the degradation grayscale determiner 163 may determine the degradation grayscale DG using the linear correlation between the degradation time change ratio constant and the degradation grayscale DG. The degradation grayscale determiner 163 may determine the degradation grayscale DG of the compensation region and output the degradation grayscale DG to the compensation value calculator 164.

The compensation value calculator 164 may calculate the compensation value CV of the characteristic value deviation of the compensation region based on the degradation grayscale DG. For example, the compensation value calculator 164 may calculate the compensation value CV by selectively applying a characteristic value compensation model corresponding to the degradation grayscale among a plurality of characteristic value compensation models.

As illustrated in FIG. 7, the luminance change ratio corresponding to the degradation ratio compared to one or more initial values may be varied according to the degradation grayscale DG. In one embodiment, the characteristic value compensation models may be varied according to the degradation grayscales DG. For example, y1, y2, y3, and y4 may represent varied degradation grayscales DG. In FIG. 7, the degradation grayscale may increase from y1 to y4, where y1 is the lowest grayscale and y4 is the highest grayscale. When the compensation region is degraded by a low grayscale (e.g., in case of y1), overshoot in the graph may be relatively significant. In contrast, when the compensation region is degraded by a high grayscale (e.g., in case of y4), overshoot in the graph may be relatively small. Since the luminance change ratio corresponding to the degradation ratio may be varied according to the degradation grayscale, the characteristic value compensation model according to the degradation grayscale may be varied according to the degradation grayscale.

For example, the characteristic value compensation models according to the degradation grayscale may have varied compensation offsets. A compensation offset of y 1 (which is degraded by relatively low grayscale) may be relatively small. In contrast, a compensation offset of y4 (which is degraded by relatively high grayscale) may be relatively great.

The characteristic value compensation models corresponding to the degradation grayscale DG may include the compensation offsets corresponding to the degradation grayscale DG. The compensation value calculator 164 may include a lookup table which stores the plurality of the characteristic value compensation models corresponding to the degradation grayscales. The compensation value calculator 164 may receive the degradation grayscale DG from the degradation grayscale determiner 163 and may calculate the compensation value CV of the characteristic value deviation of the compensation region, by selectively applying the characteristic value compensation model corresponding to the degradation grayscale from the lookup table. The compensation value calculator 164 may calculate the compensation value CV for each degradation grayscale, so that the display apparatus 100 may compensate a characteristic value deviation of the pixel PX of the display panel 110 more accurately.

Figure 8:
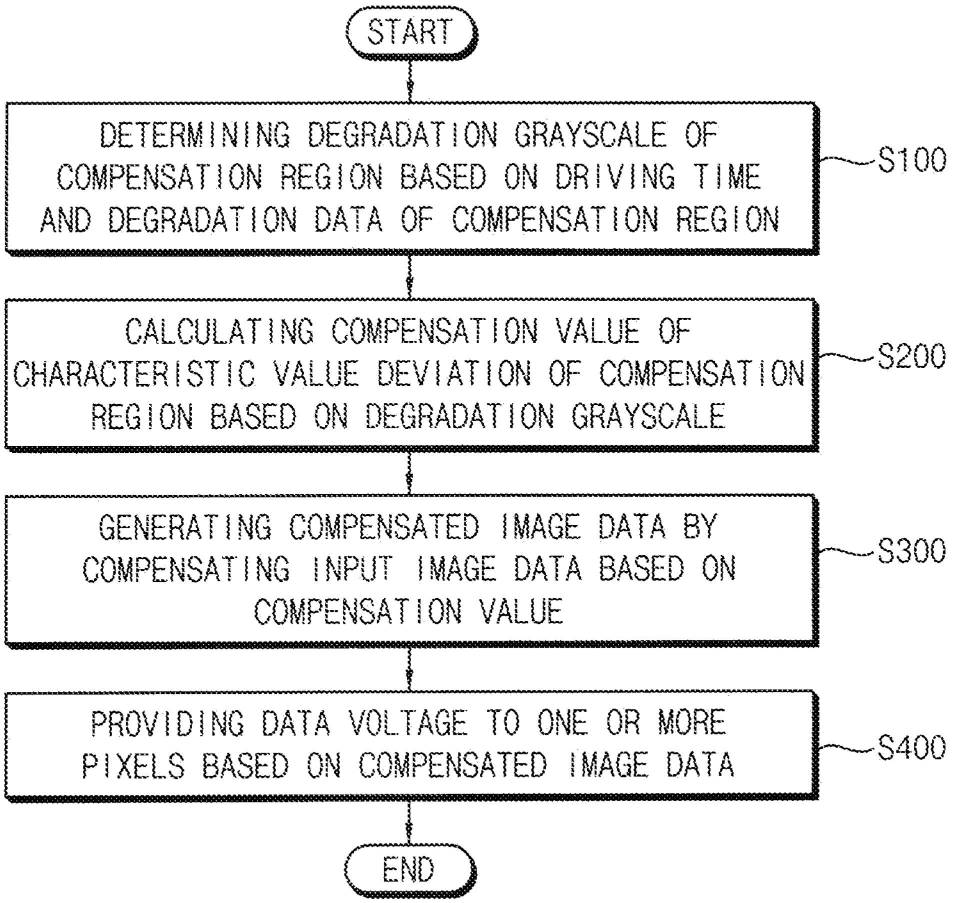
FIG. 8 illustrates an embodiment of a compensation method for a display apparatus.

FIG. 8 is a flowchart illustrating operations of one embodiment of a compensation method of a display apparatus, which, for example, may correspond to display apparatus 100.

Referring to FIGS. 5 to 8, according to the present inventive concept the display apparatus 100 may determine the degradation grayscale DG of the compensation region based on the driving time DT and the degradation data DD of the compensation region (operation S100), may calculate the compensation value CV of the characteristic value deviation of the compensation region based on the degradation grayscale DG (operation S200), may generate the compensated image data CDAT by compensating input image data DAT based on the compensation value CV (operation S300), and may provide the data voltage to the pixel PX based on the compensated image data CDAT (operation S400).

In an embodiment, the display apparatus 100 may determine the degradation grayscale DG of the compensation region based on the driving time DT and the degradation data DD of the compensation region (operation S100). The degradation grayscale determiner 163 may determine the degradation grayscale DG of the compensation region based on the driving time DT and the degradation data DD. The degradation grayscale determiner 163 may receive the driving time DT from the driving time counter 161 and may receive the degradation data DD from the degradation data generator 162. The degradation grayscale determiner 163 may calculate a degradation time change ratio by dividing the degradation data DD by the driving time DT of the pixel PX.

In one embodiment, the degradation grayscale determiner 163 may calculate a degradation time change ratio constant by dividing the degradation time change ratio by a reference degradation time change ratio. The reference degradation time change ratio may be set, for example, by a user or parameters of an intended application.

In one embodiment, the degradation time change ratio constant may have a linear correlation with the degradation grayscale DG. For example, when the degradation grayscale determiner 163 calculates degradation time change ratio constant, the degradation grayscale determiner 163 may determine the degradation grayscale DG using the linear correlation between the degradation time change ratio constant and the degradation grayscale DG. The degradation grayscale determiner 163 may determine the degradation grayscale DG of the compensation region and output the degradation grayscale DG to the compensation value calculator 164.

In an embodiment, the display apparatus 100 may calculate the compensation value CV of the characteristic value deviation of the compensation region based on the degradation grayscale DG (operation S200). The compensation value calculator 164 may calculate the compensation value CV of the characteristic value deviation of the compensation region. The compensation value calculator 164 may calculate the compensation value CV by selectively applying a characteristic value compensation model corresponding to the degradation grayscale among a plurality of characteristic value compensation models.

As illustrated in FIG. 7, the luminance change ratio corresponding to the degradation ratio compared to an initial value may be varied according to the degradation grayscale DG. The characteristic value compensation models may be varied according to the degradation grayscales DG. For example, y1, y2, y3, and y4 may represent varied degradation grayscales DG. In FIG. 7, the degradation grayscale may increase from y1 to y4, where y1 is the lowest grayscale and y4 is the highest grayscale.

When the compensation region is degraded by a low grayscale (e.g., in case of y1), overshoot in a graph may be relatively significant. In contrast, when the compensation region is degraded by a high grayscale (e.g., in case of y4), overshoot in the graph may be relatively small. Since the luminance change ratio corresponding to the degradation ratio is varied according to the degradation grayscale, the characteristic value compensation model according to the degradation grayscale may be varied according to the degradation grayscale.

For example, the characteristic value compensation models according to the degradation grayscale may have varied compensation offsets. A compensation offset of y 1 which is degraded by relatively low grayscale may be relatively small. In contrast, a compensation offset of y4 which is degraded by relatively high grayscale may be relatively great. The characteristic value compensation models corresponding to degradation grayscale DG may include the compensation offsets corresponding to degradation grayscale DG.

The compensation value calculator 164 may include a lookup table which stores the plurality of the characteristic value compensation models corresponding to the degradation grayscales. The compensation value calculator 164 may receive the degradation grayscale DG from the degradation grayscale determiner 163 and may calculate the compensation value CV of the characteristic value deviation of the compensation region, by selectively applying the characteristic value compensation model corresponding to the degradation grayscale from the lookup table.

In an embodiment, the display apparatus 100 may generate the compensated image data CDAT by compensating input image data IDAT based on the compensation value CV (operation S300). The controller 150 may receive the compensation value CV from the compensator 160, and may generate compensated image data CDAT by compensating input image data IDAT based on the compensation value CV. The controller 150 may output the compensated image data CDAT to the data driver 130.

In an embodiment, the display apparatus 100 may provide the data voltage to the pixel PX based on the compensated image data CDAT (operation S400). The data driver 130 may provide a data voltage DV to the pixel PX based on the compensated image data CDAT. Since the threshold voltages VTH of the driving transistors T1 of the degraded pixels PX are reflected in the data voltages DV generated based on the compensated image data CDAT, the pixels PX may emit light with uniform luminance. The display apparatus 100 may compensate the characteristic value deviation of the pixel PX of the display panel 110 more accurately by applying an optimal compensation model corresponding to the degradation grayscales DG. In addition, since the display apparatus 100 does not need to store the degradation data DD and does not need to include a degradation data memory, manufacturing costs of the display apparatus 100 may be reduced.

Figure 9:
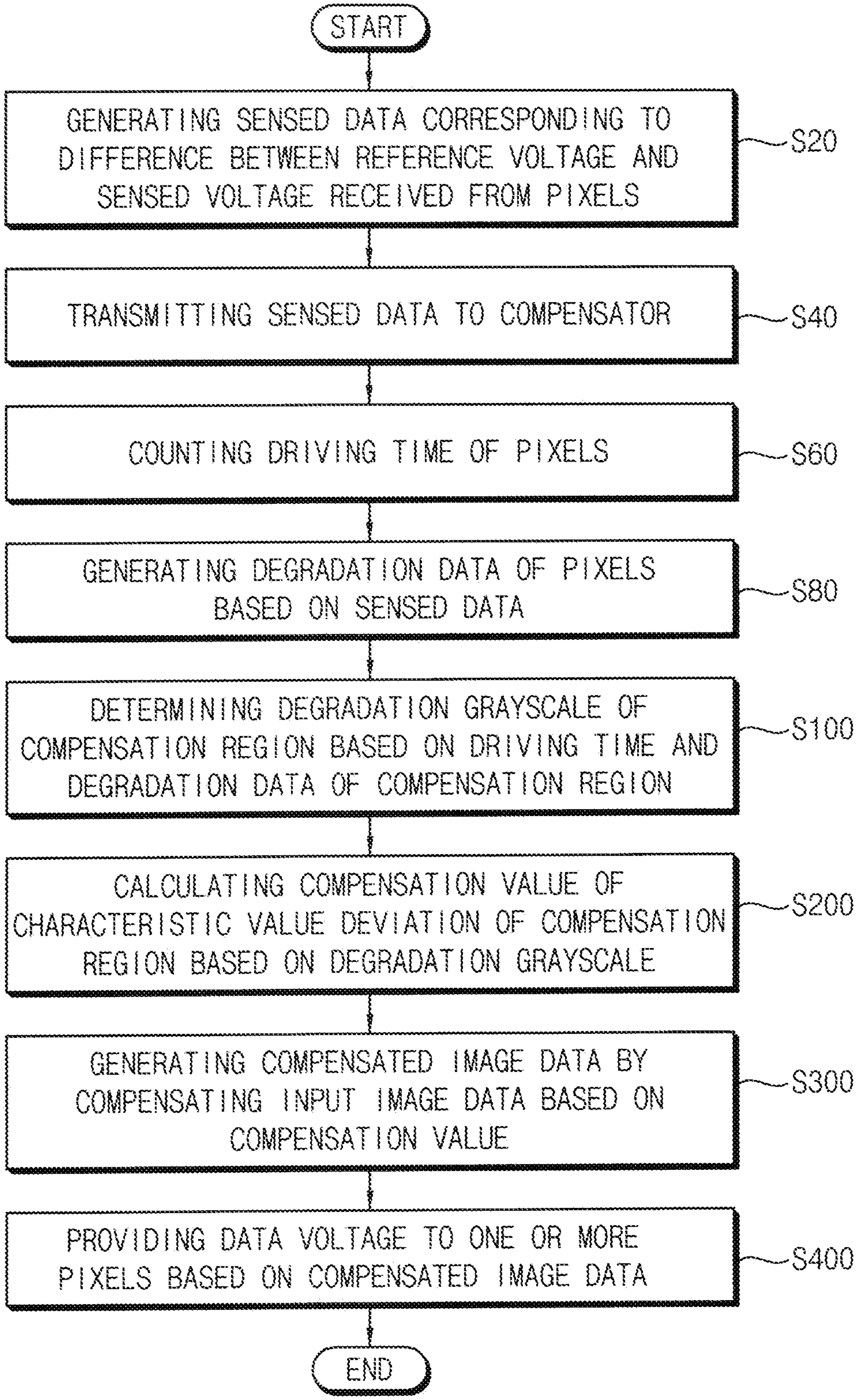
FIG. 9 illustrates an embodiment of a compensation method for a display apparatus.

FIG. 9 is a flowchart illustrating operations of a method of controlling a display apparatus, which, for example, may be display apparatus 100.

Referring to FIGS. 1 to 7 and 9, according to the present inventive concept the display apparatus 100 may receive the sensed voltage from the pixels PX, generate the sensed data SD corresponding to a difference between the reference voltage and the sensed voltage (operation S20), transmit the sensed data SD to the compensator 160 (operation S40), and count the driving time DT of the pixels PX (operation S60).

In addition, the display apparatus 100 may generate the degradation data DD of the pixels PX based on the sensed data SD (operation S80), determine the degradation grayscale DG of the compensation region based on the driving time DT and the degradation data DD of the compensation region (operation S100), calculate the compensation value CV of the characteristic value deviation of the compensation region based on the degradation grayscale DG (operation S200), and generate the compensated image data CDAT by compensating input image data DAT based on the compensation value CV (operation S300). The display apparatus 100 may then provide the data voltage to the pixel PX based on the compensated image data CDAT (operation S400).

In an embodiment, the display apparatus 100 may generate the sensed data SD corresponding to a difference between the reference voltage and the sensed voltage received from the pixels PX (operation S20). The sensing circuit 140 may be coupled to the plurality of sensing lines SL of the display panel 110, and may sense the driving characteristics (e.g., threshold voltages VTH and/or mobilities) of the driving transistors T1 of the plurality of pixels PX through the plurality of sensing lines SL.

As illustrated in FIGS. 1 and 3, for example, in a sensing period the data driver 130 may provide the reference voltage VREF to the pixels PX through corresponding data lines DL. The nodes NO between the driving transistors T1 and the organic light emitting diodes EL in the plurality of pixels PX may have voltages VREF-VTH (where the threshold voltages VTH of the driving transistors T1 are subtracted from the reference voltage VREF). The sensing circuit 140 may receive a plurality of sensed voltages VSEN, or the voltages VREF-VTH where the threshold voltages VTH are subtracted from the reference voltage VREF from the plurality of pixels PX, through the plurality of sensing lines SL.

In the sensing period, the second power supply voltage ELVSS may be adjusted to have a voltage level substantially the same as a voltage level of the first power supply voltage ELVDD. Thus, the organic light emitting diodes EL may not emit light. In addition, the sensing circuit 140 may generate sensed data SD corresponding to differences between the reference voltage VREF and the plurality of sensed voltages VSEN, or corresponding to the threshold voltages VTH of the driving transistors T1 of the plurality of pixels PX. In embodiments, the sensing circuit 140 may include an analog-to-digital converter (ADC) for converting the threshold voltages VTH to the sensed data SD, but the ADC may not be omitted in other embodiments. The controller 150 may receive the sensed data SD from the sensing circuit 140 and may transmit the sensed data SD to the compensator 160. In embodiments, the sensing circuit 140 may generate the sensed data SD when the display apparatus 100 is manufactured (or before the plurality of pixels PX is degraded), when the display apparatus 100 is powered on or off and/or periodically during an operation of the display apparatus 100.

In an embodiment, the display apparatus 100 may transmit the sensed data SD to the compensator 160 (operation S40). In one embodiment, the sensing circuit 140 may transmit sensed data SD to the controller 150, and the controller 150 may transmit the sensed data SD to the compensator 160.

In an embodiment, the display apparatus 100 may count the driving time DT of the pixels PX (operation S60). The driving time counter 161 may count a driving time of the display panel 110 from starting to ending of the driving of the display panel, and may determine the driving time of the display panel 110 as the driving time DT of the pixel. The driving time counter 161 may count a time of while an image is actually output in the compensation region. The driving time counter 161 may count a time from start of the driving of the display panel 110 to the end of the driving of the display panel 110 (e.g., the driving time of the display panel 110). For example, the driving time counter 161 may sense the starting of driving of the display panel 110 and the end of driving of the display panel 110 by detecting whether power for driving the display panel 110 is applied. The driving time counter 161 may determine the driving time of the display panel 110 as the driving time DT of the pixel PX in the compensation region. In one example, the driving time counter 161 may receive sensed data SD for at least one pixel PX in the compensation region and determine the driving time DT of the pixel PX based on the received sensed data SD.

According to an embodiment of the present inventive concept, the display apparatus 100 may compensate the characteristic value deviation for each compensation region on the display panel 110. As illustrated in FIG. 6, a plurality of compensation regions 111 and 112 may be disposed on the display panel 110. One compensation region 111 may include a plurality of pixels PX. Another compensation region 112 may be adjacent to the one compensation region 111 and may include the plurality of the pixels PX. According to the present inventive concept, the display apparatus 100 may count the driving time DT of each of the compensation regions 111 and 112 and may generate degradation data DD of each of the compensation regions 111 and 112. The display apparatus 100 may then compensate the characteristic value deviation for each compensation region. Although the compensation region includes the plurality of the pixels PX in FIG. 6 as an example, the present inventive concept may not be limited to the compensation region. For example, the compensation region may include one pixel of the plurality of the pixels PX. In one example, the compensation region may include all or a portion of the pixels of the display panel 110. In embodiments, the compensation region on the display panel 110 may be set by a user or based on requirements of an intended application.

In an embodiment, the display apparatus 100 may generate the degradation data DD of the pixels PX based on the sensed data SD (operation S80). The degradation data generator 162 may generate the degradation data DD of the pixel PX based on the sensed data SD. The sensed data SD may be an index indicating a degree of the degradation of the driving transistor T1. The degradation data generator 162 may receive the sensed data SD and may calculate the degree of degradation of the driving transistor T1 based on a change amount of the sensed data SD from initial sensed data SD. For example, the degradation data generator 162 may change the amount of the sensed data SD by comparing the initial sensed data SD with current sensed data SD. The degradation data generator 162 may generate the degradation data DD, by converting the change amount of the sensed data SD to a numerical value, may output the degradation data DD to the degradation grayscale determiner 163.

In an embodiment, the display apparatus 100 may determine the degradation grayscale DG of the compensation region based on the driving time DT and the degradation data DD of the compensation region (operation S100). The degradation grayscale determiner 163 may determine the degradation grayscale DG of the compensation region based on the driving time DT and the degradation data DD. The degradation grayscale determiner 163 may receive the driving time DT from the driving time counter 161 and may receive the degradation data DD from the degradation data generator 162. The degradation grayscale determiner 163 may calculate a degradation time change ratio by dividing the degradation data DD by the driving time DT of the pixel PX.

The degradation grayscale determiner 163 may calculate a degradation time change ratio constant by dividing the degradation time change ratio by a reference degradation time change ratio. The reference degradation time change ratio may be set by a user or determined based on requirements of an intended application. In one embodiment, the degradation time change ratio constant may have a linear correlation with the degradation grayscale DG. For example, when the degradation grayscale determiner 163 calculates degradation time change ratio constant, the degradation grayscale determiner 163 may determine the degradation grayscale DG using the linear correlation between the degradation time change ratio constant and the degradation grayscale DG. The degradation grayscale determiner 163 may determine the degradation grayscale DG of the compensation region and output the degradation grayscale DG to the compensation value calculator 164.

In an embodiment, the display apparatus 100 may calculate the compensation value CV of the characteristic value deviation of the compensation region based on the degradation grayscale DG (operation S200). The compensation value calculator 164 may calculate the compensation value CV of the characteristic value deviation of the compensation region. The compensation value calculator 164 may calculate the compensation value CV by selectively applying a characteristic value compensation model corresponding to the degradation grayscale among a plurality of characteristic value compensation models.

As illustrated in FIG. 7, the luminance change ratio corresponding to the degradation ratio compared to an initial value may be varied according to the degradation grayscale DG. The characteristic value compensation model may be varied according to the degradation grayscale DG. For example, each of y1, y2, y3, and y4 may represent varied degradation grayscale DG. In FIG. 7, the degradation grayscale may increase from y1 to y4, where y1 is the lowest grayscale and y4 is the highest grayscale.

When the compensation region is degraded by a low grayscale (e.g., in case of y1), overshoot in the graph may be relatively significant. In contrast, when the compensation region is degraded by a high grayscale (e.g., in case of y4), overshoot in the graph may be relatively small.

Since the luminance change ratio corresponding to the degradation ratio is varied according to the degradation grayscale, the characteristic value compensation model according to the degradation grayscale may be varied according to the degradation grayscale. For example, the characteristic value compensation models according to the degradation grayscale may have varied compensation offsets. A compensation offset of y1 which is degraded by relatively low grayscale may be relatively small. In contrast, a compensation offset of y4 which is degraded by relatively high grayscale may be relatively great. The characteristic value compensation models corresponding to the degradation grayscale DG may include the compensation offsets corresponding to the degradation grayscale DG.

The compensation value calculator 164 may include a lookup table which stores the plurality of the characteristic value compensation models corresponding to the degradation grayscales. The compensation value calculator 164 may receive the degradation grayscale DG from the degradation grayscale determiner 163 and may calculate the compensation value CV of the characteristic value deviation of the compensation region, by selectively applying the characteristic value compensation model corresponding to the degradation grayscale from the lookup table. The compensation value calculator 164 may calculate the compensation value CV for each degradation grayscale, so that the display apparatus 100 may compensate a characteristic value deviation of the pixel PX of the display panel 110 more accurately.

In an embodiment, the display apparatus 100 may generate the compensated image data CDAT by compensating input image data IDAT based on the compensation value CV (operation S300). The controller 150 may receive the compensation value CV from the compensator 160, and may generate compensated image data CDAT by compensating input image data IDAT based on the compensation value CV. The controller 150 may output the compensated image data CDAT to the data driver 130.

In an embodiment, the display apparatus 100 may provide the data voltage to the pixel PX based on the compensated image data CDAT (operation S400). The data driver 130 may provide a data voltage DV to the pixel PX based on the compensated image data CDAT. Since the threshold voltages VTH of the driving transistors T1 of the degraded pixels PX are reflected in the data voltages DV generated based on the compensated image data CDAT, the pixels PX may emit light with uniform luminance. The display apparatus 100 may compensate the characteristic value deviation of the pixel PX of the display panel 110 more accurately by applying an optimal compensation model corresponding to the degradation grayscales DG. In addition, since the display apparatus 100 does not need to store the degradation data DD and does not need to include a degradation data memory, a manufacturing cost of the display apparatus 100 may be reduced.

Figure 10:
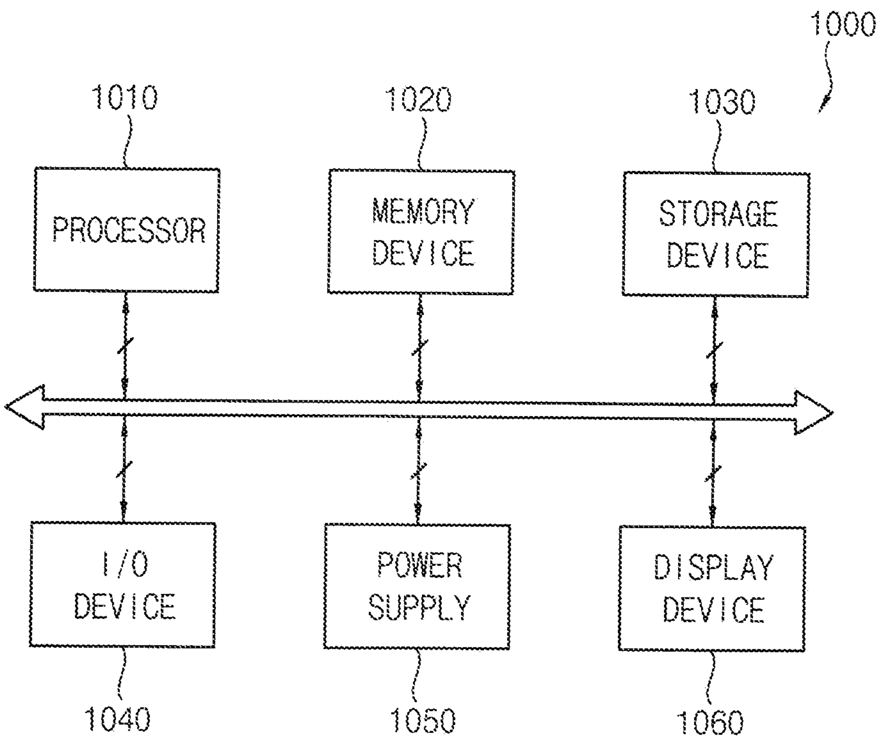
FIG. 10 illustrates an embodiment of an electronic device.
Figure 11:
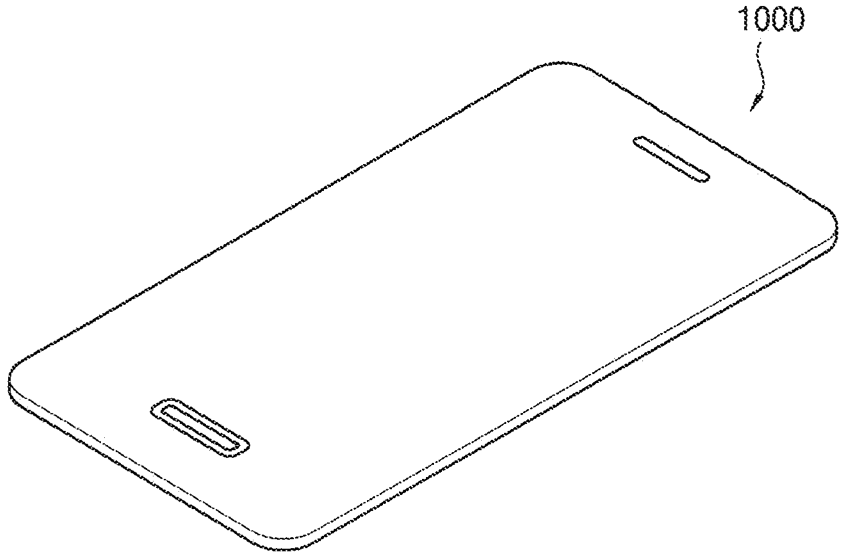
FIG. 11 illustrates an embodiment of a smartphone.

FIG. 10 is a block diagram illustrating an electronic device 1000 according to embodiments of the present inventive concept. FIG. 11 is a diagram illustrating an example in which the electronic device 1000 of FIG. 10 is implemented as a smart phone.

Referring to FIGS. 10 and 11, the electronic device 1000 may include a processor 1010, a memory device 1020, a storage device 1030, an input/output (I/O) device 1040, a power supply 1050, and a display apparatus 1060. The display apparatus 1060 may be the display apparatus 100 of FIG. 1. The electronic device 1000 may further include a plurality of ports for communicating with a video card, a sound card, a memory card, a universal serial bus (USB) device, other electronic device, and the like.

In the embodiment illustrated in FIG. 11, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a micro processor, a central processing unit (CPU), an application processor (AP), and the like. The processor 1010 may be connected to other components via an address bus, a control bus, a data bus, and the like. Further, the processor 1010 may be connected to an extended bus such as a peripheral component interconnection (PCI) bus. The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display apparatus 1060. The power supply 1050 may provide power for operations of the electronic device 1000. The display apparatus 1060 may display an image corresponding to visual information of the electronic device 1000.

In accordance with one or more of the aforementioned embodiments, the display apparatus 1060 may improve image quality by displaying an image having uniform luminance on the display panel by compensating for degradation of the display panel. The display apparatus 1060 may include a display panel including a pixel, a controller configured to generate compensated image data by compensating input image data using a degradation grayscale which is determined based on a driving time of at least one pixel included in a compensation region on the display panel and degradation data of at least one pixel included in the compensation region on the display panel and a data driver configured to provide a data voltage to the pixel based on the compensated image data.

The display apparatus 1060 may compensate the characteristic value deviation of the pixel PX of the display panel more accurately by applying an optimal compensation model corresponding to the degradation grayscales DG. In addition, since the display apparatus 1060 does not need to store the degradation data DD and does not need to include a degradation data memory, a manufacturing cost of the display apparatus 1060 may be reduced. However, since these are described above, duplicated description related thereto will not be repeated.

The embodiments of the present inventive concept may be applied to any display apparatus and an electronic device including the same. For example, the present inventive concept may be applied to a digital TV, a 3D TV, a mobile phone, a smart phone, a tablet computer, a VR device, a PC, a home electronic device, a notebook computer, a PDA, a PMP, a digital camera, a music player, a portable game console, a navigation, etc.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, devices, drivers, controllers, compensators, counters, determiners, generators, calculators and other signal generating and signal processing features of the embodiments disclosed herein may be implemented, for example, in non-transitory logic that may include hardware, software, or both. When implemented at least partially in hardware, the controllers, processors, devices, drivers, controllers, compensators, counters, determiners, generators, calculators and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, devices, drivers, controllers, compensators, counters, determiners, generators, calculators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings of the present inventive concept. Accordingly, such modifications are intended to be included within the scope of the present inventive concept as defined in the claims.

It is to be understood that the foregoing embodiments are illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein. The embodiments may be combined to form additional embodiments.

What is claimed is:

1. A display apparatus, comprising:

a display panel including a plurality of pixels; and a display panel driver configured to determine a degradation grayscale of a compensation region of the display panel, configured to generate compensated image data for input image data based on the degradation grayscale and configured to provide a data voltage to at least one pixel of the plurality of pixels based on the compensated image data, wherein the degradation grayscale is determined based on a driving time of the at least one pixel in the compensation region and degradation data corresponding to the at least one pixel.

2. The display apparatus of claim 1, wherein:

the display panel driver comprises a compensator and a controller, the compensator calculates a compensation value of a characteristic value deviation of the compensation region based on the degradation grayscale, and outputs the compensation value to the controller, the controller is configured to compensate the input image data based on the compensation value, and the compensator comprises:

a driving time counter which counts the driving time of the at least one pixel;

a degradation data generator which generates the degradation data of the at least one pixel based on sensed data;

a degradation grayscale determiner which determines the degradation grayscale of the compensation region based on the driving time of the at least one pixel and the degradation data of the pixel; and a compensation value calculator which calculates the compensation value of the characteristic value deviation of the compensation region.

3. The display apparatus of claim 2, wherein the degradation grayscale determiner calculates a degradation time change ratio by dividing the degradation data of the at least one pixel by the driving time of the at least one pixel.

4. The display apparatus of claim 3, wherein the degradation grayscale determiner:

calculates a degradation time change ratio constant by dividing the degradation time change ratio by a reference degradation time change ratio, and determines the degradation grayscale based on the degradation time change ratio constant.

5. The display apparatus of claim 2, wherein the compensation value calculator calculates the compensation value by selectively applying a characteristic value compensation model corresponding to the degradation grayscale among a plurality of characteristic value compensation models.

6. The display apparatus of claim 5, wherein the compensation value calculator includes a lookup table which stores the plurality of the characteristic value compensation models corresponding to the degradation grayscales.

7. The display apparatus of claim 2, further comprising:

a sensing circuit connected to a plurality of sensing lines, wherein the data driver is configured to provide a reference voltage to the at least one pixel using a plurality of data lines, and the sensing circuit is configured to receive a sensed voltage from the at least one pixel using the plurality of the sensing lines and generate the sensed data corresponding to a difference between the reference voltage and the sensed voltage.

8. The display apparatus of claim 7, wherein the controller is configured to:

receive the sensed data from the sensing circuit, and transmit the sensed data to the compensator.

9. The display apparatus of claim 2, wherein the driving time counter:

counts a driving time of the display panel from a starting time to an ending time of driving of the display panel, and determines the driving time of the display panel as the driving time of the at least one pixel.

10. The display apparatus of claim 2, wherein the compensation region on the display panel is set by a user.

11. A display panel driver, comprising:

a compensator determines a degradation grayscale of a compensation region of a display panel, the degradation grayscale determined based on a driving time of at least one pixel in the compensation region and degradation data corresponding to the at least one pixel;

a controller configured to generate compensated image data for input image data based on the degradation grayscale; and a data driver configured to provide a data voltage to the at least one pixel based on the compensated image data.

12. The display panel driver of claim 11, wherein:

the compensator is calculates a compensation value of a characteristic value deviation of the compensation region based on the degradation grayscale, and to output the compensation value to the controller, the controller is configured to compensate the input image data based on the compensation value, and the compensator comprises:

a driving time counter which counts the driving time of the at least one pixel;

a degradation data generator which generates the degradation data of the at least one pixel based on sensed data;

a degradation grayscale determiner which determines the degradation grayscale of the compensation region based on the driving time of the at least one pixel and the degradation data of the pixel; and a compensation value calculator which calculates the compensation value of the characteristic value deviation of the compensation region.

13. The display panel driver of claim 12, wherein the degradation grayscale determiner calculates a degradation time change ratio by dividing the degradation data of the at least one pixel by the driving time of the at least one pixel.

14. The display panel driver of claim 13, wherein the degradation grayscale determiner:

calculates a degradation time change ratio constant by dividing the degradation time change ratio by a reference degradation time change ratio, and determines the degradation grayscale based on the degradation time change ratio constant.

15. The display panel driver of claim 12, wherein the compensation value calculator calculates the compensation value by selectively applying a characteristic value compensation model corresponding to the degradation grayscale among a plurality of characteristic value compensation models.

16. The display panel driver of claim 15, wherein the compensation value calculator includes a lookup table which stores the plurality of the characteristic value compensation models corresponding to the degradation grayscales.

17. The display panel driver of claim 12, further comprising:

a sensing circuit configured to receive a sensed voltage from the at least one pixel and generate the sensed data corresponding to a difference between a reference voltage and the sensed voltage, wherein the data driver is configured to provide the reference voltage to the at least one pixel.

18. The display panel driver of claim 17, wherein the controller is configured to:

receive the sensed data from the sensing circuit, and transmit the sensed data to the compensator.

19. The display panel driver of claim 12, wherein the driving time counter:

counts a driving time of the display panel from a starting time to an ending time of driving of the display panel, and determines the driving time of the display panel as the driving time of the at least one pixel.

* * * * *